United States Patent [19]
Deters

[11] Patent Number: 5,890,424
[45] Date of Patent: Apr. 6, 1999

[54] METHOD AND APPARATUS FOR RECYCLING A USED FLUID FILTER

[76] Inventor: Paul R. Deters, 107 First St. SW., Eitzen, Minn. 55931

[21] Appl. No.: 980,390

[22] Filed: Nov. 28, 1997

[51] Int. Cl.[6] .................................. B30B 9/20; B30B 9/32
[52] U.S. Cl. ........................... 100/37; 100/39; 100/98 R; 100/110; 100/161; 100/172; 100/176; 100/902
[58] Field of Search .................................. 100/37, 39, 47, 100/98 R, 110, 121, 131, 161, 170, 172, 176, 902

[56] References Cited

U.S. PATENT DOCUMENTS

| | | | |
|---|---|---|---|
| 75,101 | 3/1868 | Willoughby | 100/161 |
| 132,536 | 10/1872 | Jones | 100/161 |
| 3,504,621 | 4/1970 | Qualheim | 100/172 |
| 3,951,059 | 4/1976 | Morris | 100/172 |
| 4,345,679 | 8/1982 | DeWoolfson | 100/902 |
| 4,927,085 | 5/1990 | Oberg . | |
| 4,967,776 | 11/1990 | Folmar . | |
| 5,060,564 | 10/1991 | Buford et al. . | |
| 5,205,195 | 4/1993 | Crosslen et al. . | |
| 5,214,830 | 6/1993 | Rozycki . | |
| 5,236,136 | 8/1993 | McCarty et al. . | |
| 5,243,754 | 9/1993 | Tasch et al. . | |
| 5,297,479 | 3/1994 | Negus . | |
| 5,298,079 | 3/1994 | Guymon . | |
| 5,299,348 | 4/1994 | Slack et al. . | |
| 5,349,901 | 9/1994 | Brittain et al. | 100/37 |
| 5,383,397 | 1/1995 | Battles et al. . | |

FOREIGN PATENT DOCUMENTS

| | | | |
|---|---|---|---|
| 987953 | 4/1976 | Canada | 100/98 R |
| 374279 | 12/1939 | Italy | 100/172 |
| 63-286296 | 11/1988 | Japan | 100/902 |
| 5-146895 | 6/1993 | Japan | 100/902 |
| 5-318193 | 12/1993 | Japan | 100/902 |

*Primary Examiner*—Stephen F. Gerrity
*Attorney, Agent, or Firm*—J. D. Kramm Law Office; John Kramm

[57] ABSTRACT

A method and apparatus for kneading used fluid filters having an initial kneader and a final kneader disposed subsequent to the inital kneader. The initial kneader includes a first roller and a second roller disposed on the frame adjacent to the first roller at a distance less than the diameter of the used fluid filter. The first and second rollers include a bar extending longitudinally along the perimeter of each of the first and second rollers for grabbing the used fluid filter. The second roller rotates faster than the first roller and includes a high bar extending longitudinally along the perimeter of the second roller for shearing away the filter plate from the filter canister. The final kneader includes a fifth roller and a sixth roller on the frame adjacent to the fifth roller at a distance less than the distance between the first roller and the second roller. The fifth and sixth rollers include a plurality of points. A floater is used for biasing together the fifth roller to the sixth roller and includes an air bag assembly. Each kneader may include a thickness adjuster. The final kneader may also have a dejammer that uses a hydraulic cylinder. An intermediate kneader is optionally disposed between the initial kneader and the final kneader.

19 Claims, 5 Drawing Sheets

METHOD AND APPARATUS FOR RECYCLING A USED FLUID FILTER

BACKGROUND OF THE INVENTION

This invention relates generally to recycling a used fluid filter, and more particularly to kneading a used fluid filter.

An economically and environmentally better way of dealing with vehicle and equipment used oil filters is needed. That major need for solutions to the problems of preventing waste and pollution in general has prompted federal and state governments to establish offices dedicated to conserving and recovering resources, planning for waste management and promoting the increased recycling of problem materials.

The need of some states' market development priorities is for a process or technology that accomplishes toxicity reduction and conservation of resources, and must recycle the majority of components of the problem material in a way that is more cost-effective, recovers more of the material for recycling, or prepares the material for higher value use than existing processes or technologies. Nonrecyclable residuals should be minimized and must comply with all applicable laws and regulations.

"Problem Material" means a material that, when it is processed or disposed of with mixed municipal solid waste, contributes to one or more of the following results: (1) the release of a hazardous substance, or pollutant, or contaminant (2) pollution of water (3) air pollution or (4) a significant threat to the safe or efficient operation of a solid waste facility. "Post-consumer material" means material generated by a business or a consumer that has served its intended end use and has been separated from solid waste for collection and recycling. "Recyclable material" is a post-consumer material that can presently be recycled or that demonstrates potential to be recycled. Motor and vehicle fluids and filters are among some states' priority projects for the development of new recycling technologies, recycling capacity, or recycled-content products for problem materials.

The significant pollution problems caused by the disposal of vehicle used oil filters has led to additional restrictions for dealing with vehicle used oil filters. Currently various standards may apply to the handling, disposal or recycling of vehicle used oil filters. EPA standards may differ from State standards. Some states permit landfills to accept used oil filters, other states impose restrictions, while still other states refuse to accept these filters at all in state landfills. For example, Wisconsin landfills presently will only accept vehicle used oil filters that have been drained from a warm engine to increase the amount of oil drained out of the filter while neighboring Minnesota landfills refuses all vehicle used oil filters completely.

A major problem to recycling vehicle used oil filters is that draining and crushing filters may still fail to remove over 90% of the oil contaminants which some mills require before accepting any crushed metal for recycling. When neither the recycling mills nor the state landfills will accept those filters as is, what to do with these used oil filters becomes a more important problem. There also would be a benefit to finding a way to reduce the transportation costs and pollution of vehicle used oil filters and to reduce the volume displaced at the landfill of vehicle used oil filters.

An example of an apparatus for severing an oil filter, separating the filter's components, and then crushing the filter components to facilitate recycling or waste disposal is disclosed in Tasch et al. U.S. Pat. No. 5,243,754 which produces recycling materials that are dropped into separate receptacles, one for the filter plates, one for the crushed filter elements and one for the crushed filter canisters. Additionally, an oil pan collects a volume of oil drained upon severing the filter plate from filter canister.

The apparatus utilizes in part a fixed front plate, a small vertical wall, a separator plate, a crushing plate and a moveable back plate, all perpendicular to the table top.

A plurality of rotatable wheel cutters move radially into contact with the outer periphery of the filter canister to support the canister, captured behind the cutter wheels. A rotatable block carrying sharp horizontally projecting impaling pins which penetrate the bottom of the filter. A rotary air wrench drives the rotary block to sever the filter plate from the filter canister. A filter element gripper mechanism retracts the filter element from the filter canister and then drops the filter element between the separating plate and a short height vertical wall. The filter canister drops between the separator plate and crushing plate. Tandem air cylinders have air cylinder rods that extend and retract horizontally causing the moveable back plate to move horizontally along the table top. The back plate moves toward the front plate thereby serially crushing the filter canister and element. Thus, the materials are dropped into separate receptacles, one for the filter plates, one for the crushed filter elements and one for the crushed filter canisters.

Some prior practices in this case are considered to be substantially exemplified by Negas U.S. Pat. No. 5,297,479 which utilizes a oil filter crusher that includes a cylinder with a dome, a base plate and a movable platform located along the cylinder. An oil filter is placed with its longitudinal axis aligned vertically onto the platform. The user presses a button, the platform moves upwardly, ramming the oil filter against the base plate and crushing it into nearly a twisted hockey puck shape. The crushed filter is subsequently removed manually.

A drawback to known devices and methods for severing an oil filter, separating the filter's components, and then crushing the filter components to facilitate recycling or waste disposal is the several parts and steps required and the amount of time required to process a filter. Although, in general, known devices that use a filter ramming platform have performed satisfactorily, some of those devices have not been found to be entirely suitable in applications where processing two or more filters simultaneously and expressing over 90% of oil from the used oil filter is a major requirement.

For the foregoing reasons, there is a need for providing a method and apparatus for kneading a used oil filter that uses fewer separating parts and shortens filter processing time. Another need is to provide for processing two or more filters simultaneously and for expressing over 90% of oil from the used oil filter to make the filter suitable for metal recycling.

It therefore is an object of this invention to provide a method and apparatus for kneading a used oil filter that uses fewer separating parts and shortens filter processing time. Another object is to provide for processing two or more filters simultaneously. A further object is to provide for expressing over 90% of oil from the used oil filter to make the filter suitable for metal recycling.

SHORT STATEMENT OF THE INVENTION

According to the present invention, the foregoing and other objects are attained by providing a method and apparatus for kneading used fluid filters that comprises an initial kneader and a final kneader disposed subsequently to the initial kneader. An initial kneader can be used for separating and for longitudinally kneading the used fluid filter; and a final kneader disposed to accept the used fluid filter exiting the initial kneader can be used for expressing at least 90% and up to 98% of the fluid from the used fluid filter. The used fluid filter that is kneaded longitudinally is flattened lengthwise for a number of benefits in direct contrast to vertically crushing it into an irregular hockey puck shape. The apparatus produces from the used fluid filter what originally could not be recycled, a solid material suitable for recycling.

The apparatus for kneading used fluid filters of the present invention includes a frame and a drive mounted onto the base of the frame. The initial kneader includes a first roller disposed on the frame, and a second roller disposed on the frame adjacent to the first roller at a distance less than the diameter of the used fluid filter. The first roller and the second roller are connected to the drive.

The first roller includes a bar extending longitudinally along the perimeter of the first roller for grabbing the used fluid filter between the first and second rollers. The second roller includes a bar extending longitudinally along the perimeter of the second roller and a high bar extending longitudinally along the perimeter of the second roller for shearing away the plate of the filter from the canister of the filter. The second roller rotates faster than the first roller to also facilitate shearing away the filter plate from the filter canister.

The final kneader includes a fifth roller disposed on the frame, and a sixth roller disposed on the frame adjacent to the fifth roller at a distance less than the distance between the first roller and the second roller, the fifth roller and the sixth roller being connected to the drive. The fifth and sixth rollers each includes a plurality of points disposed across its body perimeter. A means for biasing together the fifth roller to the sixth roller is used. In a preferred embodiment of the invention the means for biasing together the fifth roller to the sixth roller principally comprises a floater. The floater includes an air bag assembly.

Each kneader may have a thickness adjuster. The thickness adjuster is disposed on the frame for controlling the kneading depth of the used fluid filter. The dejammer provides one way for fixing the final kneader when the kneader is jammed by the filter. Manual access to the jammed filter through the appropriate reinforcer provides another way for fixing the final kneader when jammed.

In a preferred embodiment of the present invention, an intermediate kneader is disposed between the initial kneader and the final kneader. As in the previous embodiment, a means for biasing together the fifth roller to the sixth roller is used.

The present invention includes a method for kneading a used fluid filter comprising initially kneading the filter by longitudinally kneading the used fluid filter and subsequent to the initial kneading, finally kneading the used fluid filter exiting the initial kneading for expressing at least ninety percent of the fluid from the used fluid filter. This method produces, starting with a nonrecyclable used fluid filter, a solid material suitable for recycling. A preferred embodiment of the invention further comprises, between the initial kneading and the final kneading, an intermediate kneading of the filter.

The method and apparatus for kneading used fluid filters of the present invention provides an economically and environmentally better way of dealing with vehicle and equipment used oil filters. The present invention helps with reducing waste and pollution in general, conserving and recovering resources, and promoting the increased recycling of used fluid filter problem materials.

The present invention addresses the need for a process that accomplishes toxicity reduction and conservation of resources, and that recycles the majority of components of the problem material in a way that is more cost-effective, recovers more of the material for recycling, or prepares the material for higher value use than existing processes. Nonrecyclable residuals are further minimized because instead of destroying the recycling potential of oil to recycle the metal, now both the oil and the metal from the used oil filter can be recycled. The present invention also helps one to properly dispose of the previously toxic used oil filters assists in compliance with applicable laws and regulations. This invention is to provide a method and apparatus for kneading a used oil filter that uses fewer separating parts and shortens filter processing time. This invention provides for processing two or more filters simultaneously. Even more importantly, the present invention can be used for expressing over 90% of oil from the used oil filter by kneading to make the filter suitable for metal recycling.

BRIEF DESCRIPTION OF THE DRAWINGS

Other objects and many of the attendant advantages of this invention will be readily appreciated as the same becomes better understood by reference to the following detailed description and when considered in connection with the accompanying drawings in which like reference numerals designate like parts throughout the figures and embodiments thereof.

DETAILED DESCRIPTION OF A PREFERRED EMBODIMENT

A preferred embodiment of the new and improved method and apparatus for fluid filter recycling embodying the principles and concepts of the present invention will be described now more specifically and be illustrated by way of example in FIGS. 1–5.

Overview

With specific reference to the first embodiment of the invention illustrated in FIG. 1, the method and apparatus for kneading used fluid filters comprises an initial kneader 20 and a final kneader 40 disposed subsequently from the initial kneader 20. An initial kneader 20 can be used for separating and used for longitudinally kneading the used fluid filter 140. A final kneader 40 disposed to accept the used fluid filter 140 exiting the initial kneader 20 can be used for expressing at least 90 percent of the fluid from the used fluid filter. The used fluid filter 140, which is kneaded longitudinally for a number of benefits, is flattened lengthwise instead of vertically crushing the used fluid filter 140 into an irregular hockey puck shape. The filter kneading apparatus 10 produces, from the used fluid filter 140 which originally could not be recycled, a solid material suitable for recycling.

In a preferred embodiment, an intermediate kneader 30 is disposed between the initial kneader 20 and the final kneader 40 for additional kneading the used fluid filter 140. Each of the kneaders, the initial kneader 20, the intermediate kneader 30, and the final kneader 40, comprise a pair of rollers. Each roller has a generally cylindrical shape and is made of metal. Each roller includes a body that extends over most of the roller and a shaft welded to and extending from each end of the body through the front frame 14 and the back frame 16. The distal end from the body of each shaft defines a slot, for example, six inches length and ⅝th inch depth. Except for the faster second roller 24, all the rollers rotate at the same desired speed. Each of the rollers has about the same size. The size of each roller can vary depending on the number of kneaders used in the filter kneading apparatus 10. For example, a two kneader embodiment would use larger rollers that rollers in a three kneader embodiment.

As used in this description and in the appended claims, the following term "kneading" as used with this apparatus and as shown in FIGS. 1–5, is derived from some visual similarity to the kneading process done with dough and specifically here means a compressive force sequentially applied to a used fluid filter 140 along the longitudinal axis of the used fluid filter 140 starting from one end of the used fluid filter 140 to the other end. The kneading action simultaneously applies onto the whole used fluid filter by the initial kneader 20, in addition to the gripping and compressing forces, an expressing force and a shearing force which the known crusher devices lack. Rollers of all three kneaders must apply smooth, even, coequal and simultaneous pressure onto both siders of the filter in the claimed invention in contrast to the unequal, alternating or staggered pressure onto both sides of the workpiece of devices of the type disclosed by Qualheim to accomplish the different intended results.

Frame 11

A preferred embodiment of the method and apparatus for fluid filter recycling has a filter kneading apparatus 10 in FIGS. 1–5 that is made predominately of ½"–¾" steel and has a relative size approximately height 80", width 36" and depth 24". The filter kneading apparatus 10 includes a frame 11 in the form of a rectangular L-shape as shown in FIGS. 1–4. The frame 11 includes the front frame 14, the back frame 16 and the base frame 12. The base frame 12, FIGS. 1–4, supports the front frame 14 and the back frame 16 and it provides space for collecting oil expressed from the used fluid filter 140 into the oil sump catch pan 148. The front frame 14, FIGS. 1–4, has a flat, rectangular sheet shape and is made of steel. The back frame 16, FIGS. 1,2,4, has a similar size, shape and composition to the front frame 14. The back frame is positioned parallel to the front frame 14 on top of the base frame 12. Shields (not shown) surround the outside of the frame and parts of the filter kneading apparatus 10 but are not necessary to the operation of the filter kneading apparatus 10. However, in the preferred embodiment seven shields (not shown) may be used to protect an operator from splashing oil and flying bits of debris as well as to augment the gathering of expressed oil dripping down the shields into a suitable oil collecting means such as the oil sump catch pan 148.

Drive 100

Mounted on top of the base frame 12 in any suitable manner is a drive 100. The drive 100 in FIGS. 2,4 principally includes the electric motor 102 and the speed reducer 106. The electric motor 102, in FIGS. 2,4 may take the form of two ten-horsepower motors which is of conventional design known in the art with an electric on/off switch. The speed reducer 106 in FIGS. 2,4 may be a typical speed reducer rotated by the motor 102 at, for example, about 1750 rpm reduced to 30 rpm using a 56.8 to 1 ratio. A manufacturer source could be, for example, Stober Drives Inc., 1512 Industrial Park Dr., Maysville Ky. 41056.

Electrical

Figure 2:
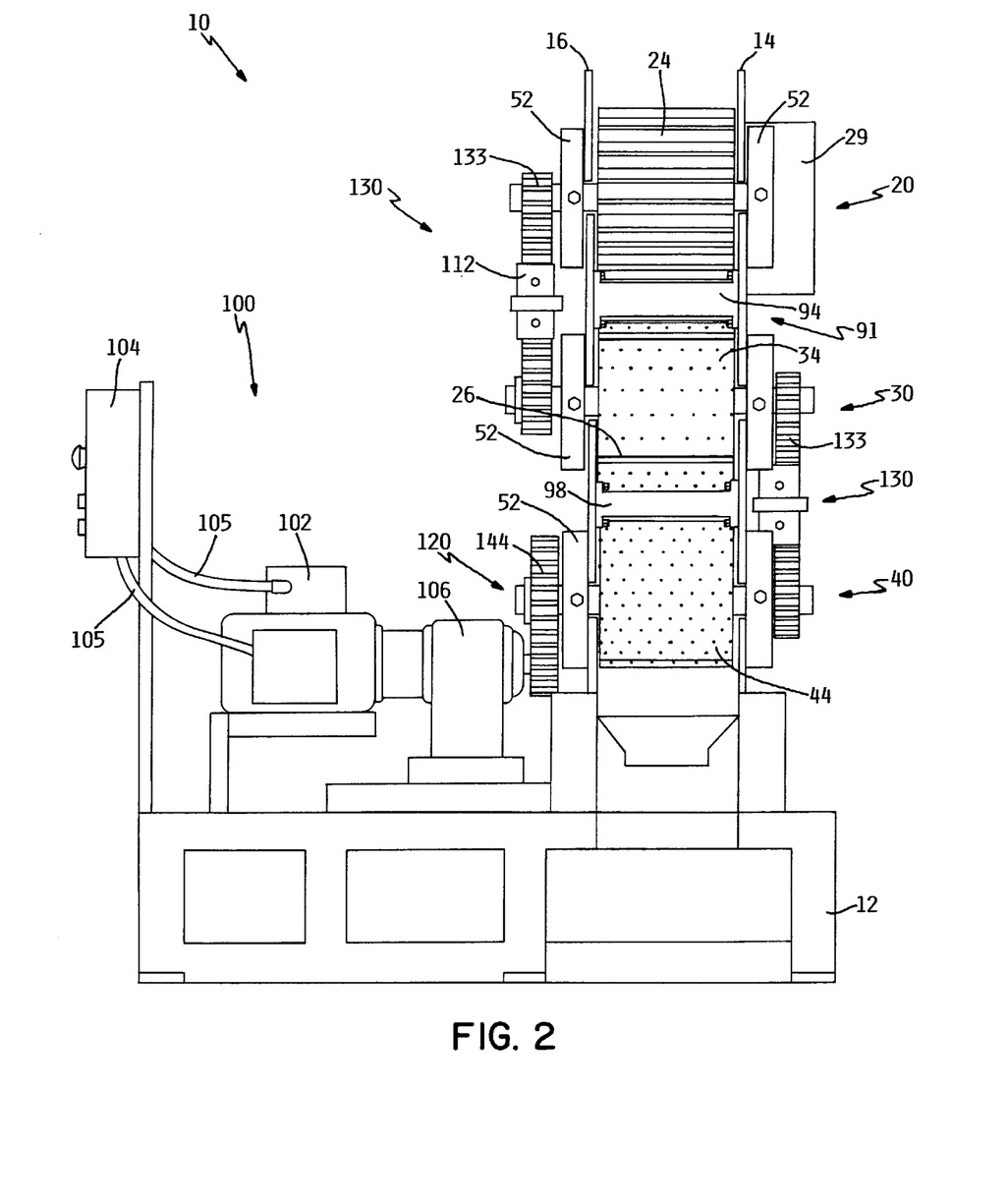
FIG. 2 is a left side elevational view of a preferred embodiment.
Figure 4:
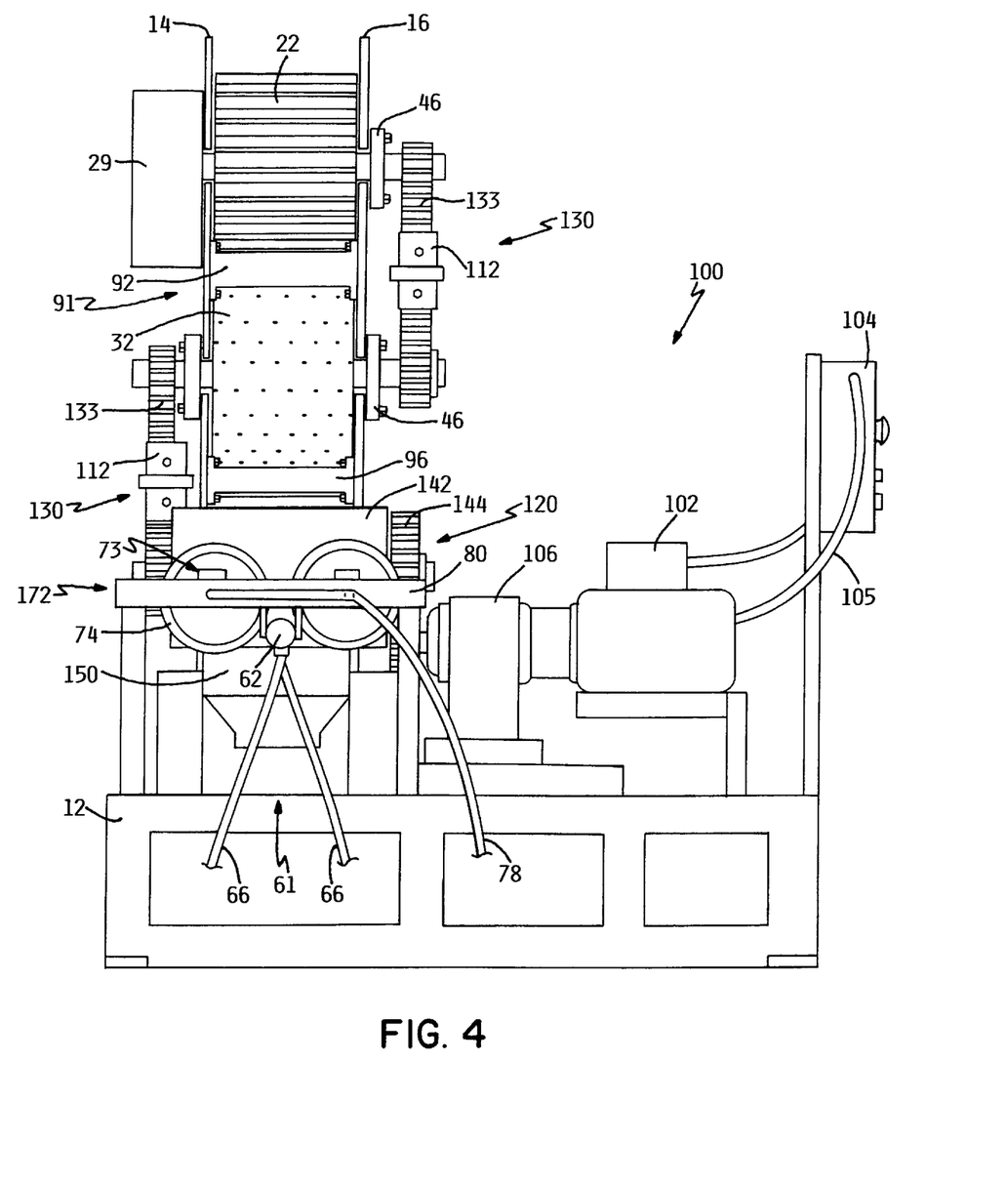
FIG. 4 is a right side elevational view of a preferred embodiment.

Standard electrical cords 105 shown in FIGS. 2,4 are connected to the electric motor 102 at one end and at the other end to a power control 104. Additional electrical cords (not shown) connect at one end the power control 104 in FIGS. 2,4 to a plug (not shown) at the other end thereof. The plug is insertable into a suitable electrical outlet for supplying electrical energy to drive the electric motor 102.

Initial Kneader 20

Figure 3:
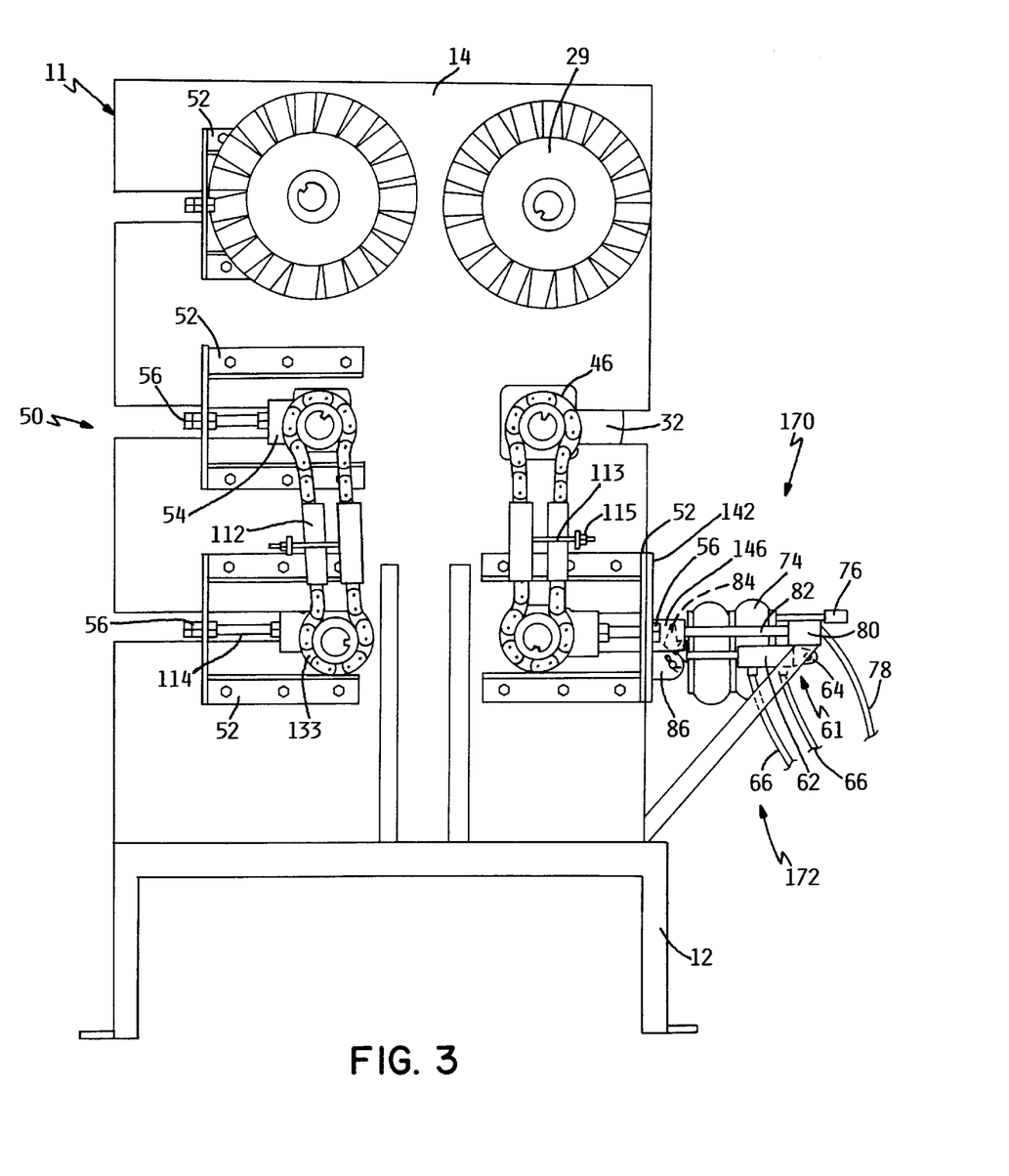
FIG. 3 shows a front side elevational view of a preferred embodiment.
Figure 5:
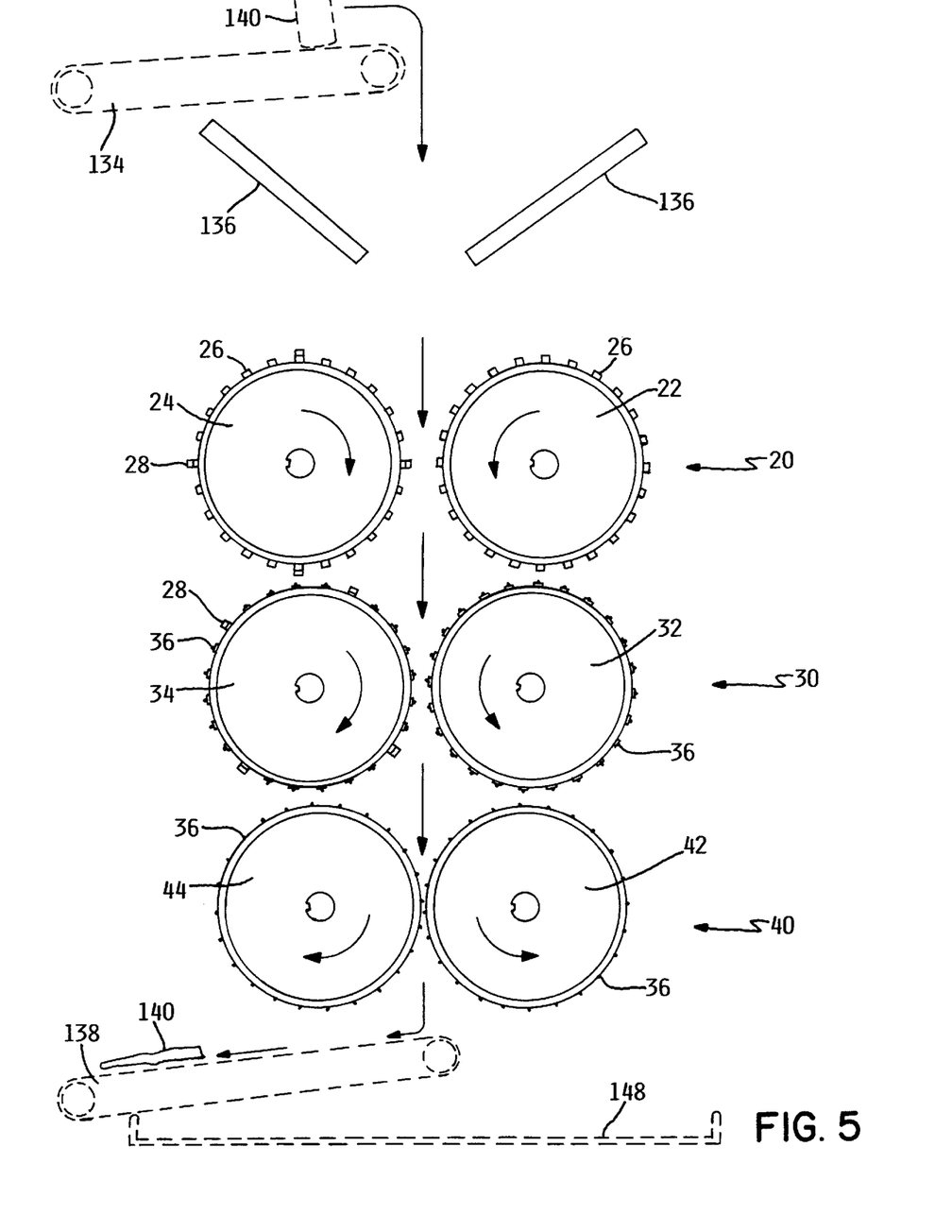
FIG. 5 shows front side diagramic view of the initial kneader, intermediate kneader and final kneader.

The initial kneader 20 includes a first roller 22 disposed on the frame, and a second roller 24 disposed on the frame adjacent to the first roller 22 at a distance less than the diameter of the used fluid filter 140. From a front elevational perspective, the first roller 22 rotates counterclockwise and the second roller 24 rotates clockwise and are each connected to the drive. The first roller 22 of FIGS. 1,2,5 is fixedly mounted through fixed bearings 46 in FIGS. 1,3,4 upon the front frame 14 and the back frame 16. The first roller 22 includes at least a bar 26 integral with the body of the first roller 22 extending longitudinally along the perimeter of the first roller 22 for grabbing the used fluid filter 140 between the first and second rollers 22 & 24. A bar 26, FIGS. 1,2,4,5, in a preferred embodiment, has approximately the same height and width and is constructed of an A514 steel bar. A plurality of the bars 26 are spaced about one inch from each other around the body of the first roller 22. A fly wheel 29 FIGS. 3,4 is disposed on the terminal end of the first roller 22 shaft outside of the front frame 14.

The second roller 24 also includes a bar 26, preferably a plurality of bars 26, extending longitudinally along the perimeter of the second roller 24 and a high bar 28 extending longitudinally along the perimeter of the second roller for shearing away the plate of the used filter 140 from the canister of the used filter 140. The second roller 24 in FIGS. 1,2,4,5 is slidably mounted through the take up bearing 54, FIGS. 1,3, upon the front frame 14 and the back frame 16. The high bar 28 shown in FIG. 5 is preferably a plurality of high bars 28 disposed upon the body of the second roller 24 evenly spaced between each other and separated by a plurality of the bar 26. The high bar 28 has a rectangular shape and is proportionally the same width and twice the height of the bar 26. A fly wheel 29 in FIGS. 3,4 is disposed on the terminal end of the second roller 24 shaft outside of the front frame 14. Additionally, the second roller 24 rotates about six RPMs faster than the first roller 22 to shear away the base plate from the canister housing of the used fluid filter 140. Thus, the initial kneader 20 shown in FIGS. 1–5 has both a shearing function and a kneading function upon the used fluid filter 140.

Final Kneader 40

The final kneader 40 has a similar size, shape and steel construction as the initial kneader 20. The final kneader 40 is mounted below the initial kneader 20 onto the front frame 14 and the back frame 16 for additionally kneading of and expressing oil from the used fluid filter 140. The final kneader 40 includes a fifth roller 42 disposed on the frame, and a sixth roller 44 disposed on the frame adjacent to the fifth roller 42 at a horizontal distance less than the horizontal distance between the third roller 32 and the fourth roller 34. Viewed from the front, the fifth roller 42 in FIGS. 1,3,4,5 rotates counterclockwise and the second roller 24 rotates clockwise and are each connected to the frame 11 by the roller interconnect 160. The fifth roller 42 and the sixth roller 44 are each slidably mounted through the take up bearings 54, FIGS. 1,3. Both the fifth roller 42 and the sixth roller 44 each include a plurality of points 36 disposed across the body of each roller 42 and 44.

FIG. 5 shows front-side diagram view of the initial kneader, intermediate kneader and final kneader. Initially, the unprocessed used fluid filter 140 in FIG. 5 is placed onto the workpiece conveyor 134 FIG. 5 for transport to the top of the filter kneading apparatus 10. Within the top portion of the front frame 14 and the back frame 16 are two inwardly slanting flat metal guide plates 136 FIG. 5. When the used fluid filter 140 falls off 134 onto the guide plates 136, the filter 140 is guided to the initial kneader 20 in between the first roller 22 and the second roller 24 for kneading and for expressing oil. Additional oil is expressed from the used fluid filter 140 by the intermediate kneader 30 and the final kneader splashes horizontally-splashes horizontally away from the kneaders 20,30,40 onto the shields (not shown) while additional oil drips down all of which reaches the oil sump catch pan 148 FIG 5. The access panel 150 FIG. 4 provides access to the oil pump (not shown). An oil pump electric motor (not shown) drives the flow of oil from the oil sump catch pan 148 through the oil pump (not shown) to a fluid storage tank (not shown). Simultaneously, the product conveyor 138 FIG. 5 transports the used fluid filter 140 exiting the final kneader 40 to a shipping container (not shown) for storage until its time for shipment to the metal recycling plant.

Intermediate Kneader 30

Optionally, in a preferred embodiment of the present invention, an intermediate kneader 30 is disposed between the initial kneader 20 and the final kneader 40 for further kneading the used fluid filter 140 upon exiting the initial kneader 20. The intermediate kneader 30 includes a third roller 32 disposed on the frame, and a fourth roller 34 disposed on the frame adjacent to the third roller 32 at a horizontal distance less than the diameter of the used fluid filter 140 and less than the horizontal distance between the first roller 22 and the second roller 24. The third roller 32 from a front view rotates counterclockwise and the fourth roller 34 rotates clockwise and are each connected to the drive. The third roller 32 FIGS. 1,3,4,5 is fixedly mounted through fixed bearing 46 FIGS. 1,3,4 upon the front frame 14 and the back frame 16. The plurality of points 36 that are evenly dispersed over the body of the third roller 32 are for pulling the used fluid filter 140 between the third roller 32 and the fourth roller 34 through the intermediate kneader 30.

Figure 1:
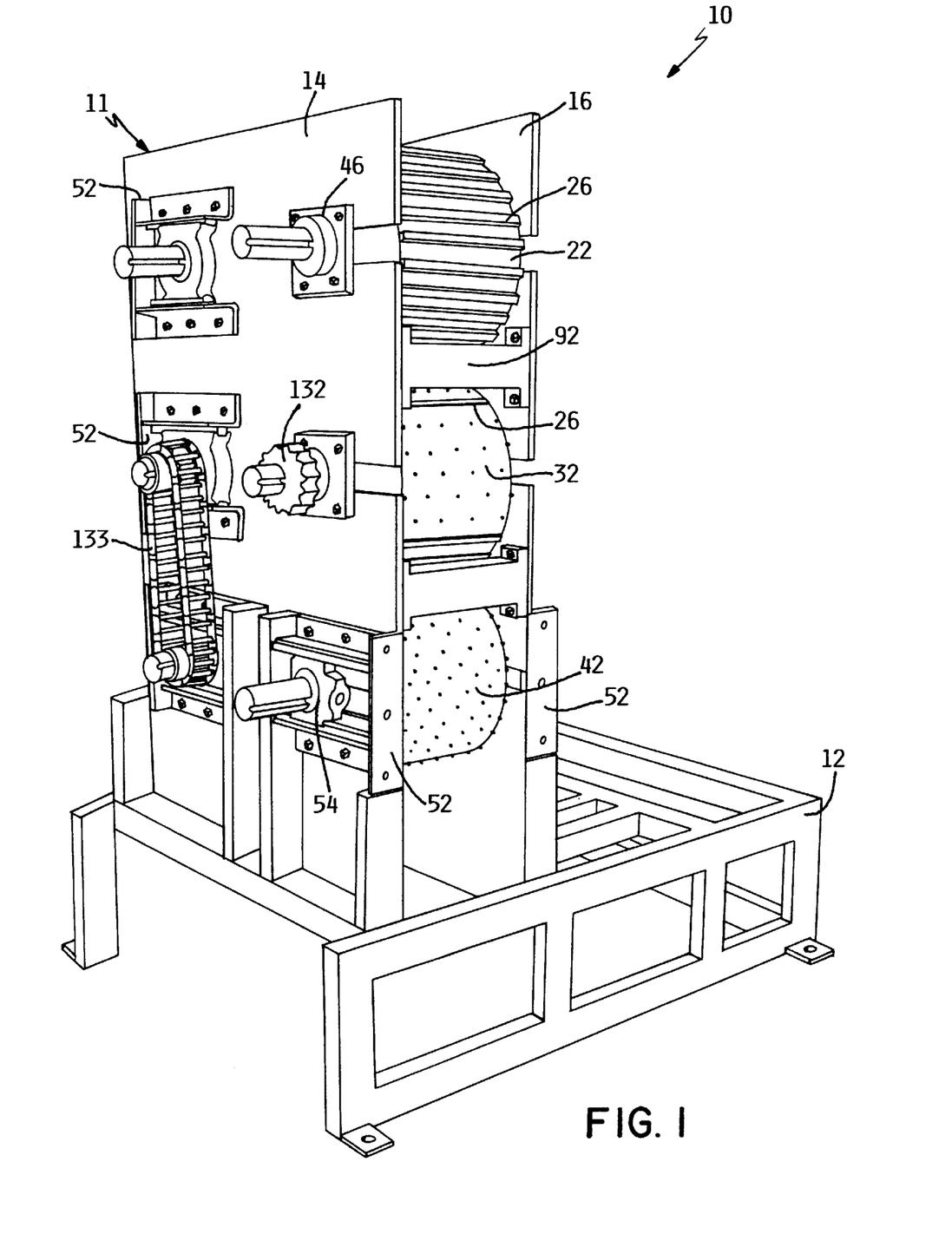
FIG. 1 shows a perspective view of the front and right sides of a preferred embodiment of method and apparatus for recycling a used fluid filter of the present invention with some elements omitted.

A fourth roller 34 FIGS. 2,5 of the intermediate kneader 30 FIG. 5 is slidably mounted near the third roller 32 through the tale up bearing 54, FIGS. 1,3, upon the front frame 14 and the back frame 16. A plurality of points 36 FIG. 5 fixed to the body of the fourth roller 34 are dispersed between a few evenly spaced high bars 28. The horizontal distance between the third roller 32 and the fourth roller 34 is less than the horizontal distance between the first roller 22 and the second roller 24.

Roller Interconnect 160

A roller interconnect 160, including a series of chains, connects the speed reducer 106 to the three kneaders 20,30, 40 and to the fly wheel 29. The roller interconnect 160 includes both the 120 chain assembly and d100 chain assembly 130. A 120-assembly 120 outside of the back frame 16 connects the speed reducer 106 to the final kneader 40 and includes the 120 heavy roller chain 144 in FIGS. 2,4 enmeshed with the 120×12 sprocket (not shown), the 120 connector link (not shown), the 120 half link (not shown), and the 120×21 sprocket (not shown). The d100 assembly 130 outside of the front frame 14 connects the fifth roller 42 with the third roller 32 while another connects the sixth roller 44 with the fourth roller 34. The d100×13 sprocket 132 on the third roller 32 enmeshes the d100 double roller chain 133 FIGS. 2,4 at one end and the d100×19 sprocket (not shown) enmeshes with the other end of the chain 133. Outside of the back frame 16, d100 chain assembly 130 connects the fourth roller 34 with the second roller 24. Another d100 chain assembly 130 connects the third roller 32 with the first roller 22. A floating chain tightener 112, FIGS. 2,3,4, includes a rod FIG. 3 and a nut FIG. 3. The floating chain tightener 112 is disposed in the middle of each the d100 double roller chains 133 for reducing slack in the chain 133 during operation.

Thickness Adjuster 50

The thickness adjuster 50 is disposed on the frame 11 for controlling the kneading depth of the used fluid filter 140. The thickness adjuster 50, FIG. 3, includes the adjustable bearing holder 52, FIGS. 1,2,3, the take up bearing 54, FIGS. 1,3, the 1¼" grade 8 jam nut 56, FIG. 3 and the 1¼×grade 8 threaded rod 114 of FIG. 3.

Each of the eight adjustable bearing holders 52 used on the filter kneading apparatus 10 have the same size and shape. The adjustable bearing holder 52 has a three-sided square shape defining a hole in the middle portion of the base of the adjustable bearing holder 52 for the 1¼ inch grade 8 threaded rod 114 to pass through. Each arm of the adjustable bearing holder 52 has a 90-degree L-shape and defines three apertures on each arm portion that abuts against and is secured by screws to the front frame 14 or the back frame 16. Centered on and welded to the other portion of each arm of the adjustable bearing holder 52 and facing the other arm is a solid rectangular bar having a length extending over most of the arm of the adjustable bearing holder 52 but stopping short of the base of the adjustable bearing holder 52. A flat triangular shaped piece of metal is welded onto each arm at its intersection with the base on the edges of the arm and the base opposite the abutting portion of each arm. The triangular piece covers the gap left between the base and the solid bar.

The take up bearing 54 is retained by and slidable along the adjustable bearing holder 52, when the 1¼" grade 8 jam nut 56 is screwed over the 1¼×grade 8 threaded rod 114 connected to the take up bearing 54.

A thickness adjuster 50 may be used with one or all of the three kneaders 20,30,40 for setting the horizontal distance between the pair of rollers to control the kneading depth of the used fluid filter 140 that passes through the kneader. The thickness adjuster 50 for the initial kneader 20 can be set at a kneading depth of less than the diameter of the used fluid filter 140 but greater than kneading depth set on the thickness adjuster 50 for the intermediate kneader 30. The thickness adjuster 50 for the final kneader 40 could then be set at a kneading depth of less than that of the intermediate kneader 30.

Means 170 for Biasing

A means 170 for biasing together the fifth roller 42 to the sixth roller 44 is used to apply and maintain constant, uniform, yet biasing force between those rollers and therefore upon the used fluid filter 140 as it is passes through the final kneader 40. A spring or hydraulic cushion shock may be used but in a preferred embodiment of the invention, the means 170 for biasing together the fifth roller 42 to the sixth roller 44 principally comprises a floater 172.

The floater 172 is mounted on the right side of the filter kneading apparatus 10 and connected to the fifth roller 42 of the final kneader 40. The floater 172 includes the main mounting plate 142, the pivot finger 84, the sliding frame 146, the end frame 80, the slide rails 82, and the air bag assembly 73. Starting with the part closes to the right side of the filter kneading apparatus 10 and then moving outward, the main mounting plate 14 shown in FIG. 3 abuts against the base of the adjustable bearing holder 52 for the fifth roller 42 and is mounted on the right side of the front frame 14 and the back frame 16. The pivot finger mount 86 is secured to a lower portion of the main mounting plate 142. One side of the finger portion of the pivot finger 84 abuts against the main mounting plate 142 and is pivotally mounted to the pivot finger mount 86. The other side of the finger portion of the pivot finger 84 abuts against the sliding frame 146 which extends parallel to the main mounting plate 142. The rectangular shape of the sliding frame 146 is a composite of a hollow metal two-by-four board shape with a metal plank integral with the side of the sliding frame 146 facing the main mounting plate 142. An U-bracket is welded to the metal plank near both ends of the sliding frame 146. The end frame 80 of FIGS. 3,4 extends parallel with and has a similar size and shape as the sliding frame 146 except the metal plank is disposed upon the outermost vertical side of the end frame 80. A metal end support extends diagonally from the end frame 80 to the base frame 12 to support the end frame 80. A collar of sliding frame 146 (not shown) is disposed through an aperture near both ends of the sliding frame 146 and extends beyond the sliding frame 146 toward the end frame 80. The slide rails 82 at one end are fixedly mounted to the main mounting plate 142, FIG. 3. Each slide rail 82 extends perpendicularly from the main mounting plate 142 through the collar of sliding frame 146 (not shown) to be rigidly fixed to the end frame 80. The 1¼" grade 8 jam nut 56 disposed inside the U-bracket on the metal plank near both ends of the sliding frame 146 attaches to one end of the 1¼ inch grade 8 threaded rod 114. The 1¼ inch grade 8 threaded rod 114 extends parallel to the slide rails 82 through the main mounting plate 142 and the adjustable bearing holder 52 to the take up bearing 54 of the fifth roller 42 at the other end of the 1¼" grade 8 threaded rod 114.

An air bag assembly 73 is disposed within the sliding frame 146, the end frame 80 and the slide rails 82. The air bag assembly 73 includes the air bag 74, the air valve (not shown), the air pressure gauge 76 as shown in FIG. 3, and the air line intake nozzle (not shown). The air bag 74 in FIGS. 3,4 is of conventional design, available commercially, and is well known to those of ordinary skill in the art. The air hose 78 FIGS. 3,4 is controlled with an air valve (not shown) and communicates with an air supply (not shown) at one end and the air line intake nozzle (not shown) at the other end. As viewed in FIG. 4, The air-line intake nozzle (not shown) bifurcates to the right side of the air bag 74 and to the left side of the air bag 74 by a pipe leading to the air pressure gauge 76. Another pipe at one end communicates air from the air pressure gauge 76 to the left side of the air bag 74 at the other end.

The means 170 for biasing together rollers 42, 44 FIGS. 3,4 in the form of the floater 172 applies constant, uniform, and biasing force upon the used fluid filter 140 as it is passes through the final kneader 40 between those rollers 42,44. To increase the biasing force of the floater 172, air is added to inflate the air bag 74 from the air supply through the air hose 78. The expansion of the air bag 74 forces the sliding frame 146 to pivot the pivot finger 84 against the main mounting plate 142. Simultaneously, the sliding frame 146 horizontally forces the 1¼" grade 8 threaded rod 114, the take up bearing 54 and thus the fifth roller 42 against the sixth roller 44. Thus, the inflated air bag 74 applies constant but floating tension upon the fifth roller 42, onto the used fluid filter 140 and the sixth roller 44. To free a jammed filter in the final kneader 40, release the biasing force of the floater 172 by deflating the air bag 74.

Reinforcer 91

Manual access to the jammed filter through the appropriate reinforcer 91 provides another way for fixing a jammed kneader. The reinforcer 91 is detachably mounted in four locations on the left and right sides of the filter kneading apparatus 10 for structural support of the front frame 14 and the back frame 16 and for manual access to a jammed filter between two rollers. The 1st reinforcer 92 FIG. 1 is disposed between the first roller 22 and the third roller 32. The 2nd reinforcer 94 FIGS. 2,4 provides manual access between the second roller 24 and the fourth roller 34. Between the third roller 32 and the fifth roller 42 is mounted the 3rd reinforcer 96 FIG. 4. Finally, the 4th reinforcer 98 FIG. 2 is disposed between the fourth roller 34 and the sixth roller 44. This second method to free a jammed filter by means of the reinforcer 91 can be used instead of or in addition to deflating the air bag 74 method or opening the dejammer 61 method.

Dejammer 61

The dejammer provides a third way for fixing the final kneader 40 when the kneader is jammed by a filter. The dejammer 61 includes a hydraulic cylinder 62, the two hydraulic hoses 66 and the hydraulic valve (not shown). The hydraulic cylinder 62, FIGS. 3,4, is mounted below and in parallel with the slide rails 82 and between the left and right sides of the air bag 74. One end of the hydraulic cylinder 62 is fixed to the hydraulic cylinder mount 64 as shown in FIG. 3. At that same end of the hydraulic cylinder 62 are mounted the 2 hoses 66 FIGS. 3,4. As viewed in FIG. 4, the hose 66 closest to the hydraulic cylinder mount 64 has fluid flowing toward the hydraulic cylinder 62 from a hydraulic fluid supply (not shown) controlled by the hydraulic valve (not shown). The other hose 66 farthest from the hydraulic cylinder mount 64 has fluid exiting the hydraulic cylinder 62. The other end of the hydraulic cylinder 62 is connected to the base of the pivot finger 84 for pivoting the finger in the desired horizontal direction, away from the main mounting plate 142 when activating or toward the main mounting plate 142 when deactivating the dejammer 61.

The present invention includes a method for kneading a used fluid filter including the steps of initially kneading the used fluid filter 140 by longitudinally kneading the used fluid filter 140; Subsequent to the initial kneading, finally kneading the used fluid filter 140 for the purpose of expressing at least ninety percent of the fluid from the used fluid filter 140. This method produces, starting with a nonrecyclable used fluid filter 140, a solid material suitable for recycling. A preferred embodiment of the invention further comprises, between the initial kneading and the final kneading, an intermediate kneading of the used fluid filter 140.

Operations

The purpose of the method and apparatus for fluid filter recycling is to convert a nonrecyclable used fluid filter 140 by kneading it into solid and fluid materials suitable for recycling. Kneading has some similarity to the kneading process done with dough and specifically here means a compressive force sequentially applied to a used fluid filter 140 along the longitudinal axis of the used fluid filter 140 starting from one end of the used fluid filter 140 to the other end. The main sequences in a preferred three kneader embodiment includes initial kneading, intermediate kneading and final kneading.

Before the initial kneading, convey the unprocessed used fluid filters 140 to top of the filter kneading apparatus 10 and then drop those filters into the top of the filter kneading apparatus 10. Except for the faster rotating second roller 24, all the rollers are rotating at the same constant speed. The used fluid filter 140 bounces off and falls between the guide plates 136 down to the initial kneader 20 between the rotating counterclockwise the first roller 22 and clockwise the second roller 24. Setting a predetermined depth to the initial, intermediate and final kneading of the whole filter's canister, element & plate together is controlled by the thickness adjuster 50. The initial kneading begins with the bar 26 on both rollers 22,24 that grab the used fluid filter 140 down and between the rollers 22,24. Also, the high bar 28 is shearing away the base plate from the canister housing of the used fluid filter 140 to improve kneading results. The initial kneading compresses longitudinally the whole filter canister, element & plate together. Also, the initial kneading expresses oil from the used fluid filter 140. The initial kneading concludes upon expelling and dropping the kneaded used fluid filter 140 into the intermediate kneader 30.

The intermediate kneading commences by grabbing the used fluid filter 140 with the high bar 28 and the plurality of points 36 down and between the rollers 32,34. The intermediate kneading further compresses longitudinally the whole filter canister, element and plate together and expresses oil from the used fluid filter 140. The intermediate kneading concludes upon expelling and dropping the kneaded the used fluid filter 140 into the final kneader 40.

The plurality of points 36 pull the used fluid filter 140 down and between the rollers 42,44 during the final kneading to further compress and to express by kneading more than 90% of the oil from the used fluid filter 140. Applying and maintaining a constant, uniform, yet biasing force between those rollers 42,44 and therefore upon the used fluid filter 140 as it is passes through the final kneader 40 is done with the floater 172. The final kneading concludes upon expelling and dropping the kneaded used fluid filter 140, a recyclable material with as little as 5% to 2% oil content, onto the product conveyor 138.

This final kneading filter of the used fluid filter 140 is conveyed to the shipping container (not shown). Preferably, the kneaded filter is also baled by a conventionally designed baler, known in the art and available commercially. Then, transport the bale or the shipping container (not shown) of kneaded filters to a scrap metal recycler. The expressed oil inside the filter kneading apparatus 10 is collected by the oil sump catch pan 148. The oil is pumped from the oil sump catch pan 148 by the oil pump (not shown) driven by the oil pump electric motor (not shown) to the fluid storage tank (not shown) for subsequent transportation to a suitable oil recycler.

A variety of filter sizes and types may be kneaded by the filter kneading apparatus 10. The optimum amount of force to set the means 170 for biasing together rollers 42,44 for the final kneader 40 may vary by the size and type of fluid filter being kneaded. A preferred method of using the means 170 for biasing together rollers 42,44 is to adjust the floater 172 to apply as much pressure to the fifth roller 42 against the sixth roller 44 as possible without too many of the used fluid filters 140 jamming. For example in a preferred embodiment the air bag 74 pressure is adjusted to its maximum 110 PSI (pounds per square inch).

To help determine a proper amount of load for specific operating conditions, one can determine the actual working pressure required. Specifically, the surface area multiplied by the pressure applied by the air bag 74 gives the actual working pressure. For example, a given a surface area of 144 square inches and the applied pressure from the air bag 74 of 110 PSI produces an actual working pressure of 15,840 PSI. Therefore, in a the filter kneading apparatus 10 with two air bags 74, the actual working pressure applied to the used fluid filter 140 going through the final kneader 40 is 31,680 PSI.

An operator may free a used fluid filter 140 jammed between the fifth roller 42 and the sixth roller 44 by using three alternatives. The operator can release the biasing force applied by the floater 172 by decreasing the pressure in the air bag 74. The user can also manually access the used fluid filter 140 by removing the appropriate 1st reinforcer 92, the 2nd reinforcer 94, the 3rd reinforcer 96, or the 4th reinforcer 98. If neither of these two methods is enough to free the used fluid filter 140, the user could also actuate the dejammer 61 to pull the fifth roller 42 away from the sixth roller 44. First deflate the air bag 74 of the floater 172 by opening the air dump valve (not shown). Next, actuate the hydraulic cylinder 62 of the dejammer 61 by turning the valve of the hydraulic cylinder 62 to extend the hydraulic cylinder 62. At that time, the end of the hydraulic cylinder 62 that is connected to the base of the pivot finger 84 forces that base of the pivot finger 84 toward the main mounting plate 142. That extension necessarily pivots the finger of the pivot finger 84 which is disposed between the pivot finger 84 and the main mounting plate 142 away from the main mounting plate 142. The pivot finger 84 forces the sliding frame 146 away from the main mounting plate 142 thereby pulling the bolts retained by the sliding frame 146 and threaded onto the distal end of the 1¼" grade 8 threaded rod 114 relative to the fifth roller 42 in the direction away from the main mounting plate 142. The proximate end of the 1¼ a grade 8 threaded rod 114 that is connected to the take up bearing 54 for the fifth roller 42 pulls the shaft of the fifth roller 42 away from the sixth roller 44 creating a sufficient gap between the fifth roller 42 and the sixth roller 44 to permit the used fluid filter 140 to fall freely away from the final kneader 40. The next step is to actuate the hydraulic cylinder 62 in the other direction by pushing the two-way valve of the hydraulic cylinder 62 in the opposite direction. Finally, close the air dump valve (not shown) and open the air supply valve (not shown) to reinflate the air bag 74. Resume the filter kneading apparatus 10 operation.

Advantages

The described versions of the present invention have many advantages including the economic benefit of eliminating one or more distinct steps and distinct parts previously required for separating a used oil filter 140 into discrete filter canister, element and plate parts from the process of converting a used oil filter 140 into materials suitable for oil and metal recycling products. The present invention provides a new recycling technology for some post-consumer problem materials, such as motor and vehicle fluids and filters by kneading.

An improvement over some existing methods is the ability to concurrently convert both vehicle oil and filters into materials suitable for recycled-content metal and oil products instead of crushing then dumping the filter to recycle the oil or washing the filter then dumping the oil to recycle the metal. Also, increasing the recycling capacity for some motor and vehicle fluids and filters is another advantage.

Specifically, an advantage of the present invention is the ability to process one, two or more filters simultaneously; to covert an unusable vehicle oil filter into a material acceptable to some mill recyclers by extruding over 90% of the filter's oil contaminants; and to process a variety of automobile, truck and heavy construction vehicle filter sizes. The present invention can compress the volume of vehicle used oil filters from 2 and ⅓ barrels of a 55 gallon barrel into ⅓ of one such barrel.

The invention may also increase overall average output per hour by providing a convenient way to access and to free up filters jammed between the bottom set of rollers with an air bag assembly. This invention also helps to optimize throughput for a variety of filter shapes and sizes by providing a convenient means to adjust the gap between rollers.

To compress filters into a shape suitable for baling facilitates an easier and more efficient way of conveying crushed filters from the device into containerized storage, onto a truck, transported, then unloaded by a metal recycler. Compared to uncrushed or some types of crushed filters such as the irregular hockey puck shape filter, the rectangular shape of the filter produced by this apparatus 10 and process is more compact, containerized and manageable in storage, is easier to load onto trucks, and it permits a greater volume of filters to be packed onto the same truck, all of which may reduce the number of necessary trips to the scrap metal recycler with the attendant reduction in transportation costs, time and air pollution.

Device mobility is facilitated by constructing the device 10 into a rectangular shape with approximate 80" height, 36" width and 24" depth dimensions so that the device can be loaded onto a 6'×8' decktop trailer and pulled by a pickup truck.

Alternative Embodiments

An alternative embodiment to the preferred initial, intermediate and final kneader arrangement shown in FIG. 5 is an initial and final kneader arrangement the first roller 22 would replace the third roller 32 at the same relative former position of the third roller 32. Similarly, the second roller 24 would replace the fourth roller 34 at the same relative former position of the fourth roller 34. However, the diameter and length of each roller in this two kneader embodiment would preferably be larger than the rollers' diameter and length in the three kneader preferred embodiment. One example of approximate relative size is a 26 inches to 30 inches roller length in a two kneader embodiment compared to a 12 inch diameter and 18 inch length in the three kneader preferred embodiment. Also, more power would be consumed to knead the used filter 140 in this two kneader embodiment than the preferred three kneader embodiment.

A four kneader embodiment of the invention would look similar to the three kneader embodiment shown in FIG. 5 except for the following changes. The fourth kneader has a seventh roller (not shown) that would look like the third roller 32 and would displace the first roller 22. An eighth roller (not shown) looks like the fourth roller 34 and displaces the second roller 24. The initial kneader 20 would be placed above the fourth kneader. The first roller 22 and the second roller 24 would be placed at a proportionally greater horizontal distance from each other than they were in the three kneader arrangement. The first roller 22 would be placed above the seventh roller (not shown) at the same vertical distance as the first roller 22 was placed above the third roller 32 in the three kneader embodiment. Likewise, the second roller 24 would be placed above the eighth roller (not shown) the same vertical distance as the second roller 24 was placed above the plurality of points 36 in the three kneader embodiment. All the rollers in this embodiment would preferably each have the same diameter and would have a diameter smaller than the rollers in the three kneader embodiment.

Finally, the two, three or four kneader arrangements, depicted in FIG. 5 as a front elevational view, would now as additional alternative embodiments be depicted in FIG. 5 as a top plan view whereby all the rollers and corresponding connections are rotated ninety degrees. Thus the used fluid filter 140 would travel a horizontal path through the kneaders instead of a vertical descent in the previous embodiments.

While the kneading system of the present invention has been disclosed in connection with a vehicle used oil filter it should be appreciated that the kneading system can be used for processing other fluids from other fluid containers. Obviously many modifications and variations of the present invention are possible in the light of the above teachings. It is therefore to be understood that, within the scope of the appended claims, the invention may be practiced otherwise than as specifically described.

I claim:

1. An expressing apparatus for kneading a used fluid filter having a canister, base plate and inner element intact comprising:

an initial kneader for longitudinally kneading the used fluid filter;

a final kneader disposed to receive the previously kneaded used fluid filter for expressing the fluid from the used fluid filter.

2. An apparatus for kneading a used fluid filter as recited in claim 1, further comprising:

a frame;

a drive;

wherein the initial kneader includes:

a first roller disposed on the frame; and a second roller disposed on the frame adjacent to said first roller at a predetermined distance, said first roller and said second roller being connected to said drive.

3. An apparatus for kneading a used fluid filter as recited in claim 2, wherein the said final kneader includes:

a fifth roller disposed on the frame; and a sixth roller disposed on the frame adjacent to the fifth roller at a distance less than the predetermined distance between the first and the second roller, said fifth roller and said sixth roller being connected to said drive.

4. An apparatus for kneading a used fluid filter as recited in claim 3, wherein the first roller includes a bar extending longitudinally along the perimeter of the first roller for grabbing the used fluid filter between the first and second rollers.

5. An apparatus as recited in claim 3, further comprising: means for biasing together the fifth roller to the sixth roller.

6. An apparatus as recited in claim 1, further comprising: an intermediate kneader disposed between said initial kneader and said final kneader.

7. An apparatus as recited in claim 6, further comprising: a thickness adjuster disposed on the frame for varying a predetermined distance between the rollers.

8. An apparatus as recited in claim 6, further comprising: a dejammer for fixing said final kneader when jammed by the filter.

9. An apparatus for kneading a used fluid filter having a canister, base plate and inner element intact comprising:

an initial kneader for longitudinally kneading the used fluid filter;

a frame;

a drive;

said initial kneader including a first roller disposed on the frame;

and a second roller disposed on the frame adjacent to said first roller at a predetermined distance, said first roller and said second roller being connected to said drive;

the first roller including a bar extending longitudinally along the perimeter of the first roller for grabbing the used fluid filter between the first and second rollers;

the second roller including a bar extending longitudinally along the perimeter of the second roller and a high bar extending longitudinally along the perimeter of the second roller for shearing away the plate of the filter from the canister of the filter;

final kneader disposed to receive the previously kneaded used fluid filter; and said final kneader including a fifth roller disposed on the frame;

and a sixth roller disposed on the frame adjacent to the fifth roller at a distance less than the predetermined distance between the first roller and the second roller, said fifth roller and said sixth roller being connected to said drive.

10. An apparatus for kneading a used fluid filter as recited in claim 9, wherein the fifth roller includes a plurality of points disposed across the perimeter of the fifth roller.

11. An apparatus for kneading a used fluid filter as recited in claim 10, wherein the sixth roller includes a plurality of points disposed across the perimeter of the sixth roller.

12. An apparatus as recited in claim 9, further comprising: means for biasing together the fifth roller to the sixth roller.

13. An apparatus for kneading a used fluid filter as recited in claim 12, wherein the means for biasing together the fifth roller to the sixth roller includes a floater.

14. An apparatus as recited in claim 9, further comprising: a thickness adjuster disposed on the frame for varying a predetermined distance between the rollers.

15. An apparatus for kneading a used fluid filter as recited in claim 9, wherein the second roller rotates faster than the first roller to facilitate shearing away the plate of the filter from the canister of the filter.

16. An apparatus as recited in claim 9, further comprising: a dejammer disposed on the frame for fixing said final said final kneader when jammed by the filter.

17. An apparatus for kneading a used fluid filter as recited in claim 16, further comprising: a reinforcer disposed on the frame for fixing said final kneader when jammed by the filter.

18. A method for kneading a used fluid filter having a canister, base plate and inner element intact comprising:

initially kneading the filter by longitudinally kneading the used fluid filter; and subsequent to kneading the used fluid filter, finally kneading the used fluid filter for expressing fluid from the used fluid filter.

19. A method as recited in claim 18, further comprising: between said initial kneading and said final kneading, intermediately kneading the filter.

* * * * *